United States Patent [19]

Gosden et al.

[11] 3,904,734

[45] Sept. 9, 1975

[54] DECONTAMINATION OF GAS PURIFICATION PROCESS EFFLUENT

[75] Inventors: Derek Vernon Gosden; Anthony Roland Marshall, both of Horsham; David George Robson, Crawley, all of England

[73] Assignee: Woodall-Duckham Limited, Crawley, England

[22] Filed: Dec. 18, 1973

[21] Appl. No.: 425,716

[30] Foreign Application Priority Data

Dec. 22, 1972 United Kingdom............. 59405/72

[52] U.S. Cl. ............. 423/236; 423/236; 423/567; 423/366; 423/567 A
[51] Int. Cl.² ................. C01B 17/16; C01B 31/20
[58] Field of Search ........... 423/236, 226, 242, 562, 423/567, 221, 573, 366, 567 A, 573 L, 573 G

[56] References Cited
UNITED STATES PATENTS

| | | | |
|---|---|---|---|
| 1,852,161 | 4/1932 | Hansen | 423/366 |
| 1,854,511 | 4/1932 | Hansen | 423/366 |
| 1,942,050 | 1/1934 | Davies | 423/366 |
| 3,353,906 | 11/1967 | Guerrieri | 423/242 |
| 3,536,618 | 10/1970 | Urban et al. | 423/562 |
| 3,661,507 | 5/1972 | Breitbach et al. | 423/236 |
| 3,773,662 | 11/1973 | Urban | 423/562 |
| 3,795,732 | 3/1974 | Fleming | 423/242 |

*Primary Examiner*—Oscar R. Vertiz
*Assistant Examiner*—Eugene T. Wheelock

[57] ABSTRACT

Gas purification processes in which hydrogen sulphide ($H_2S$) and/or hydrogen cyanide (HCN) are removed from a foul gas, e.g. coke-oven gas, by absorption in a circulating liquid reagent, for instance an alkaline anthraquinone disulphonic acid (ADA) salt solution or an alkaline polysulphide solution, produce an effluent containing noxious compounds with consequent disposal problems. The invention provides a method in which such an effluent is decomposed in a fluidised bed to products which may be recycled to the foul gas or to the process reagent as the case may be. Two such effluents of different types may be decomposed together in an integrated plant in which gaseous decomposition products are returned to the foul gas stream and any solids to one or the other or both of the process reagents as required.

11 Claims, 1 Drawing Figure

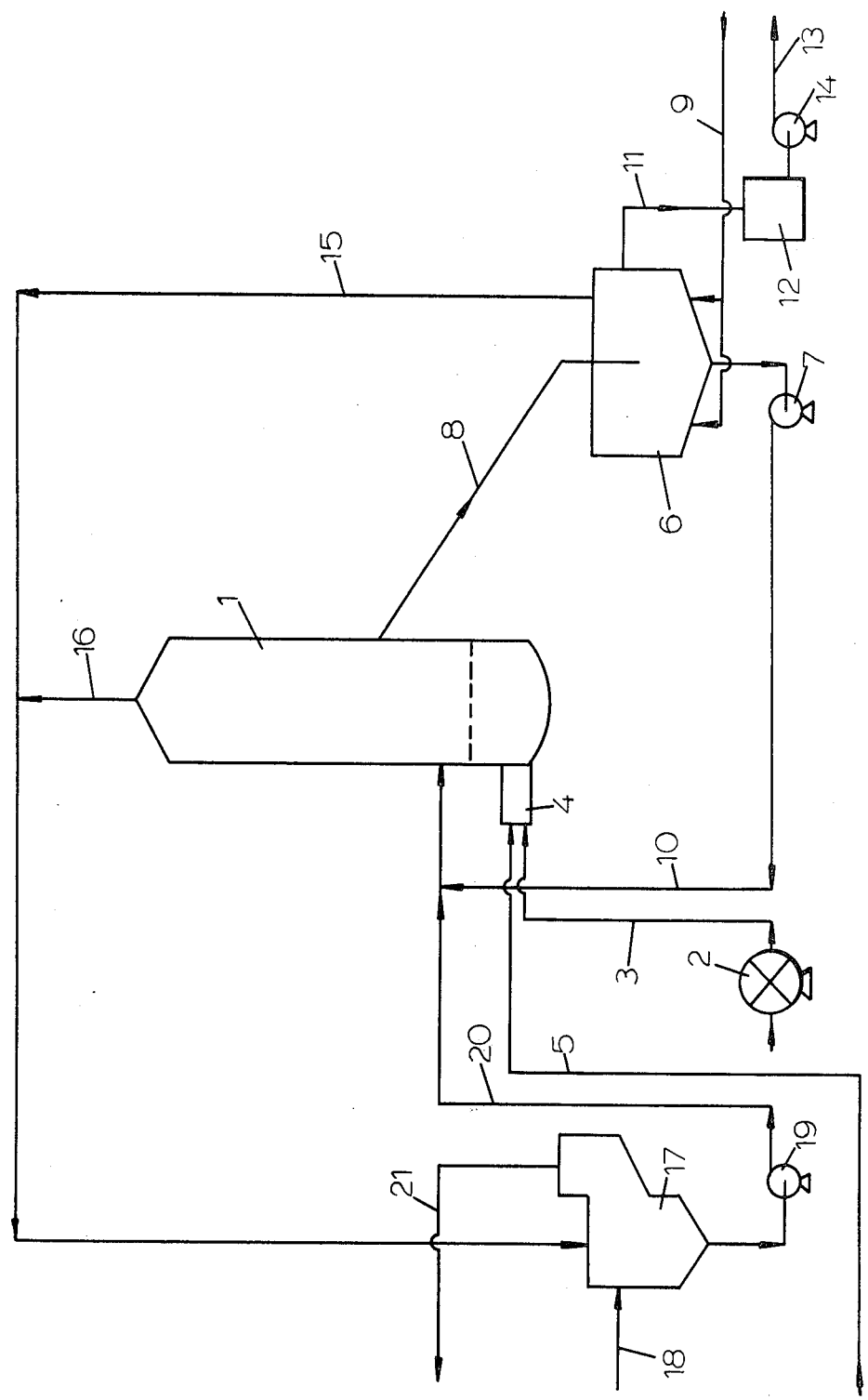

DECONTAMINATION OF GAS PURIFICATION PROCESS EFFLUENT

FIELD OF THE INVENTION

The invention concerns gas purification by processes in which hydrogen sulphide ($H_2S$) and/or hydrogen cyanide (HCN) contaminant is removed from a foul gas by absorption in a liquid reagent, absorbed $H_2S$ thereby being converted to sulphur while absorbed HCN is converted to a thiocyanate, the reagent being subsequently regenerated and recycled for absorption of further contaminant.

BACKGROUND OF THE INVENTION

The Stretford Process is typical of several processes now well established in the art of gas purification and having wide utility in the removal of $H_2S$ from foul gas streams of various compositions and origins. The liquid reagent used differs in composition from process to process and application to application: in the Stretford Process it is fundamentally an alkaline solution of one or more of the anthraquinone disulphonic acid (ADA) salts and which contains also vanadium. The foul gas stream is brought into contact with this reagent, the alkali of which reacts with the $H_2S$ in the gas to form the hydrosulphide which thereupon reacts both with the ADA and pentavalent vanadium, reducing the ADA to the hydroquinone form and the vanadium to the tetravalent state whilst liberating sulphur. The reagent is regenerated by blowing air through it, thereby floating the sulphur as a froth for removal and recovery and oxidising the reduced reagent materials back to their original respective form and state.

Another process of the same general type as the Stretford Process is the Takahax Process in which the liquid reagent is a solution of the sodium salt of naphthaquinone disulphonic acid: a variant of this process is the Perox Process in which the reagent is the ammonium salt of naphthaquinone disulphonic acid.

In practical operation of these processes, thiosulphate is formed as an unwanted by-product, as a result of oxidation of an initially-formed hydrosulphide. This oxidation may occur as a result of the presence of oxygen in the foul gas stream entering the reagent in the absorption stage or as a result of carry-over of unreacted hydrosulphide into the regeneration stage. In either event, the build-up of thiosulphate in the circulating reagent must be restricted. Similarly, sulphate tends to be formed in the reagent as an unwanted contaminant.

When, as is sometimes the case, the foul gas stream contains traces of HCN — for instance when the foul gas is a coal carbonisation by-product — this tends also to be absorbed by the circulating reagent and to appear as thiocyanate therein.

In conventional practice of these processes, the build-up of these unwanted contaminants in the circulating reagent is controlled by bleeding-off a small sidestream of spent reagent. There then arises the problem of disposal of the spent reagent, a problem that is especially acute when the contaminants include thiocyanate.

When the foul gas stream contains substantial amounts of HCN a different type of liquid reagent is usually employed, the liquid reagent in this case comprising an alkaline polysulphide wash liquor. Typically the wash liquor contains about 2% polysulphide by weight and on contact with the foul gas stream absorbs HCN with the formation of thiocyanate and polysulphide of lower sulphur content. The liquor is regenerated to restore the sulphur content of the polysulphide and the thiocyanate is removed by continually bleeding off a sidestream of the liquor, typically at a rate such as to hold the thiocyanate level in the circulating liquor at about 15% by weight. In the case of the purification of a coal carbonisation gas which contains $H_2S$ and ammonia as well as HCN, ammonium polysulphide may conveniently be employed in the wash liquor and the latter be regenerated by the addition of sulphur which reacts with ammonium sulphide formed in the liquor by absorption of $H_2S$ and ammonia from the foul gas. If the wash liquor instead comprises an alkali metal polysulphide, e.g. sodium polysulphide, regeneration in this case is accomplished by adding also a carbonate, e.g. sodium carbonate, which reacts with absorbed $H_2S$ to form the corresponding sulphide for reaction with the sulphur to generate polysulphide.

The bled-off sidestream in all cases presents a disposal problem.

Very commonly, when the foul gas stream contains both $H_2S$ and HCN an alkaline polysulphide wash liquor is used to absorb the bulk of the HCN and some of the $H_2S$ in a first washing stage, a Stretford Process or similar second stage being employed to absorb the remainder of the HCN and the bulk of the $H_2S$. Both stages then give a bled-off sidestream which presents a disposal problem owing to the thiocyanate content of the bled-off reagent.

THE INVENTION

We have found that the typical contaminants that tend to build-up in the circulating reagent of such processes as the Stretford Process may be economically withdrawn and decomposed into products that may then be returned to the reagent or to the foul gas stream being purified, as the case may be, thereby avoiding the effluent disposal problem. In addition we have found that the bled-off sidestream of the alkaline polysulphide wash liquor of processes used for absorbing HCN in the manner discussed may similarly be decomposed into products which may be returned to the foul gas stream or to the circulating reagent as the case may be.

Thus in accordance with the present invention we provide a method of decontaminating the circulating reagent in a gas purification process in which the $H_2S$ and/or HCN contaminant in a foul gas stream is absorbed by a liquid reagent, $H_2S$ thereby being converted to sulphur and HCN being converted to a thiocyanate, the reagent being subsequently regenerated and recycled for absorption of further contaminant, such method comprising bleeding-off a sidestream of said liquid reagent and subjecting the same to reduction in a fluidised bed, recycling the gaseous products of such reduction to the foul gas stream being subjected to purification by the process, and returning any solids residue of said reduction to the reagent.

The said reduction step is preferably effected at a temperature in the range 500°–800°C. at atmospheric pressure, using hydrogen or a hydrogen-containing gas, e.g. coke-oven gas, as the fluidisation medium.

The bed material must be inert with respect to the bled-off reagent, the contaminants therein and the decomposition products resulting from the reduction step, carbon (e.g. coke) being one suitable bed material for this purpose since this is often one of the decomposition products. However the preferred bed material is synthetic rutile (titanium dioxide) prepared, for instance, by upgrading ilmenite.

In the case of the Stretford Process for instance, the reagent contains principally ADA, $Na_2CO_3$ as alkali and vanadium in the form of the vanadate, $NaVO_3$; as contaminants, the bled-off sidestream contains thiosulphate as $Na_2S_2O_3$, sulphate as $Na_2SO_4$ and, if the foul gas stream contains HCN, thiocyanate as NaCNS. In the reduction reaction, the ADA will be decomposed to steam, CO, $CO_2$ and some carbon (as will also the citrate which is usually present in small amounts as a buffer), the vanadium will appear in the solids residue either unchanged as vanadate or in a lower state of oxidation, whilst the carbonate will appear unchanged in the solids residue. The thiosulphate and the sulphate will both be reduced at least to the sulphide, $Na_2S$, or, depending upon the conditions in the fluidised bed, these contaminants may be further reduced to the hydroxide and carbonate (NaOH, $Na_2CO_3$) to appear in the solids residue as such. Any thiocyanate contaminant will be decomposed in the fluidised bed to a carbonate and/or sulphide which will appear in the solids residue, and gases comprising hydrogen, nitrogen, CO, $CO_2$ and $H_2S$.

Any solids residue may be separated from the gaseous products of the reduction reaction by suitable mechanical means such as a cyclone separator, and then dissolved in a suitable solvent (which may be the liquid reagent of the purification process) to be returned, possibly after filtration, to the process reagent. If the solids contain sulphide, this will be decomposed to liberate sulphur in the course of the process.

However, in preferred embodiments of the invention, the fluidised bed material is repeatedly circulated through a leaching stage in which it is leached with the bled-off sidestream of the liquid reagent in such manner that soluble solid residues of the reduction carried out of the bed with the circulating bed material are dissolved in a portion of the reagent entering the leaching stage and are returned to the circulating reagent in that portion, while the remainder of the reagent entering the leaching stage enters the fluidised bed with the bed material returning to the bed from the leaching stage.

If the bled-off sidestream comprises the alkaline polysulphide wash liquor of a process for removing, primarily, HCN from a foul gas stream it will contain thiocyanate, sulphides and polysulphides and other salts depending upon the compositions of the liquor and of the foul gas stream. From the foregoing, however, it will be apparent that in the fluidised bed the principal constituents will be decomposed to sulphide and/or carbonate solids when alkali metal cations are present and to gases comprising hydrogen, nitrogen, CO, $CO_2$, and $H_2S$. All such products may be recycled either to the wash liquor (in the case of solids) or to the foul gas stream. Solids may be leached out of circulating fluidised bed material in the manner discussed above.

The gaseous products of the reduction reaction may be recycled to the foul gas stream at any suitable point. If the foul gas is, for instance, coke-oven gas which is subjected to primary cooling, tar separation, light oil separation and polysulphide washing prior to $H_2S$ removal by the gas purification process under consideration, it will usually be convenient to recycle the gaseous products of the reduction step to the foul gas stream at the primary cooler.

The reduction step may be carried out under pressures other than atmospheric with suitable variations in operating temperature and retention time.

The method of the invention is especially suitable for handling in one fluidised bed reduction plant the bled-off sidestreams of both a process stage such as the Stretford Process for removal of $H_2S$ from a foul gas stream and of an alkaline polysulphide washing process stage for removal of HCN from the same foul gas stream. In such a case, any solid products of the reduction may be recycled to the circulating reagent of the $H_2S$ removal stage, sulphides in such recycled products thus being caused to liberate sulphur in the operation of the $H_2S$ removal stage and providing extra recovered sulphur in that stage. Sulphur so recovered may be employed as required for regeneration of the alkaline polysulphide wash liquor of the HCN removal stage.

THE DRAWING

The accompanying drawing is a schematic diagram of plant for performing an embodiment of the method of the invention upon the sidestream effluents of $H_2S$ and HCN removal stages in the purification of coke-oven gas. The drawing illustrates only the principal components of the plant, various ancillaries being omitted in the interests of clarity.

DESCRIPTION OF ILLUSTRATED EMBODIMENT

The plant illustrated in the drawing comprises a fluidised bed reactor vessel 1 within which a bed of, e.g. synthetic rutile having a mean particle size of about 155 $\mu$ (about 90% in the range 89–211 $\mu$) is heated by combustion in the lower part of the bed of a mixture of air and coke-oven gas in proportions such that the combustion products are reducing in character. For this purpose, a compressor 2 feeds air via line 3 to a premixer 4 which also receives coke-oven gas at suitable pressure via a line 5.

The reactor vessel 1 is in circuit with a quench/leach vessel 6 through which the bed material is continually recycled by means of a slurry pump 7. Thus bed material is withdrawn from the upper levels of the bed in vessel 1 through a line 8 to the vessel 6 where it is quenched and leached with the liquid reagent used in an $H_2S$ removal state (not shown) for a coke-oven foul gas stream. For the purposes of illustration the liquid reagent may be considered to be that typically used in the Stretford Process, namely an alkaline solution of one or more anthraquinone disulphonic acid (ADA) salts (e.g. sodium salts) and containing vanadium with carbonate (e.g. $Na_2CO_3$) as alkali, and contaminants comprising thiosulphate, sulphate and thiocyanate. This reagent enters the vessel 6 from a line 9 in a manner to mix intimately with the bed material. The reagent may, for instance, be pumped into the vessel 6 through one or more sparge pipes and/or the vessel may be equipped with stirring arrangements.

The pump 7 draws a slurry of bed material and liquid reagent from the vessel 6 and feeds this slurry, via a line 10, to the lower levels of the bed in the vessel 1. Some of the slurry may be returned to the vessel 6 to accomplish stirring of the contents of the latter by repeated mixing of slurry with incoming bed material from line 8 and reagent from line 9. Conditions in the vessel 6 are such that the solid bed material settles to enable liquid which has quenched and leached the incoming bed material to be decanted from the upper part of the vessel and to flow via a line 11 to a tank 12 from which it is pumped back to the $H_2S$ removal stage via a line 13 by means of a pump 14. Some of the liquid reagent in tank 12 may be recycled to the vessel 6.

In the reactor vessel 1, various constituents of the liquid reagent entering the bed with the slurry through the line 10 will be decomposed: the ADA will decompose to steam, CO, $CO_2$ and some carbon, the vanadium, entering as $NaVO_3$, will either be unchanged or reduced to a lower state of oxidation, and the carbonate will be unchanged. The thiosulphate will be reduced, usually to the sulphide but sometimes further, to hydroxide and carbonate, and the sulphate will be similarly reduced to sulphide and/or hydroxide and carbonate. Thiocyanate is reduced to carbonate and/or sulphide and hydrogen, nitrogen, CO, $CO_2$ and $H_2S$.

The solid products, other than carbon, are mainly salts, e.g. sodium salts, which are soluble in the liquid reagent entering the vessel 6: therefore in the vessel 6 these salts are mainly leached out of the incoming bed material and contained in the outflowing decanted liquid in the line 11.

Some of the gases, both fluidising and product, in the vessel 1 will escape to the vessel 6 via the line 8: these gases are vented from the vessel 6 via a line 15 and are conveyed, with the bulk of the gases from the vessel 1 escaping via a line 16, to a preconcentrator vessel 17 where they give up heat to incoming wash liquor bled-off from an HCN removal stage in which the foul gas stream is washed with an alkaline polysulphide wash liquor.

In the vessel 17, the wash liquor sidestream entering through a line 18 is heated and partially evaporated to raise its solute concentration. For the purpose of illustration, the wash liquor may be regarded as a solution of ammonium polysulphides contaminated by ammonium thiocyanate. After concentration, the wash liquor is pumped from the vessel 17 by a pump 19 and fed via a line 20 to join the slurry entering the bed of the vessel 1 from the line 10. In the vessel 1, the constituents of this liquor are decomposed, the polysulphides being reduced to hydrogen, nitrogen and $H_2S$, and the thiocyanate to hydrogen, nitrogen, CO, and $H_2S$.

The gases leaving the preconcentrator vessel 17 through a line 21 are conveniently returned to the foul gas stream upstream of at least the $H_2S$ removal stage so that the $H_2S$ content of the gases may be extracted. Preferably line 21 would convey the gases to the foul gas stream at the primary cooler for the latter so that the returned gases should not add unwanted heat and water vapours to the foul gas stream entering the purification process.

In the foregoing description it has been assumed that the illustrated plant is to handle simultaneously the bled-off sidestreams of liquid reagent from the two purification stages discussed, and that the reagent in one case contains sodium salts giving such salts as solid products of the reduction in the reactor vessel 1. However, it should be understood that the plant could be operated on a campaign basis, handling one reagent at a time for alternate periods of operation to meet requirements.

Moreover, the plant could operate, with minor modification, with reagents both or neither of which contained sodium salts. For instance, the HCN removal stage might use a wash liquor comprising sodium polysulphides in which case sodium salts (sulphides, carbonate would appear as solid products of the reduction. With the plant as described, such products would be leached in the vessel 6 and enter the reagent of the $H_2S$ removal stage, where the sulphides would be converted to sulphur. However, it would be preferable in such a case to modify the illustrated plant so that there were two quench/leach vessels in circuit with the reactor vessel, one such vessel equivalent to the vessel 6 and operating as described with the $H_2S$ removal stage reagent and the other operating in equivalent manner with the wash liquor of the HCN removal stage.

If both purification stages used ammonium salts the reduction reactions would not give rise to solid products (other than some carbon) and the plant could be modified. Thus, for instance, the vessel 6 and its associated bed material circuit could be omitted, the reagent of the $H_2S$ removal stage being admitted directly to the reactor vessel 1 or after preconcentration, perhaps in the vessel 17.

The bed material requirements are most rigorous when solid products such as sodium salts are produced in the reduction reactions since such salts tend to attack some bed materials and cause defluidisation of others. In general, when sodium salts are produced, the bed material will usually have to be subjected to circulation through a leaching stage, as in the illustrated plant, to keep the sodium salt content of the bed material at a relatively low level and so avoid agglomeration and defluidisation. Other possible bed materials are carbon (e.g. high and low temperature cokes with particle sizes in the range $125–420\mu$) and magnesia and alumina although the latter tends to be attacked by sodium salts. When no solid products result from the reduction, the bed may be selected from a wider range of materials, including, for instance, sand.

In various trials with liquid reagents containing sodium salts and equivalent to a typical spent Stretford Process reagent, such as would normally be discarded, solid products capable of being returned to the Process reagent were obtained with operation of an experimental fluidised bed reactor at bed temperatures within the range 600°–800°C.

Instead of the directly heated fluidised bed reactor described, an indirectly-heated reactor may be used, coke-oven gas preheated to a suitable temperature by suitable heating arrangements being a convenient fluidising gas, providing the required reducing atmosphere in the reactor. However, the directly heated reactor, fired by a very oxygen-lean fuel/air mixture to provide the reducing atmosphere, is preferred because of its greater thermal efficiency, enabling a smaller reactor to be used for a given throughput than would be possible with an indirectly-heated reactor.

We claim:

1. In a gas purification process in which at least one contaminant selected from the group consisting of $H_2S$ and HCN is extracted from a foul gas stream by absorption in a liquid reagent, $H_2S$ thereby being converted to sulphur and HCN to thiocyanate and the reagent being subsequently regenerated and recycled for absorption of further contaminant, the method of decontaminating the liquid reagent which comprises:
   a. bleeding-off a sidestream of said liquid reagent;
   b. reducing said sidestream in a bed of inert particles fluidized by a reducing gas at a temperature so as to produce substantially gaseous and solid products;

c. recycling the gaseous products of such reduction to the said foul gas stream; and d. returning the solid products of said reduction to the said liquid reagent.

2. The method of claim 1, in which said reduction step is effected at a temperature in the range 500°–800°C. at atmospheric pressure.

3. The method of claim 1, in which the fluidisation medium is a gas comprising hydrogen.

4. The method of claim 1, in which the fluidised bed particles comprise a synthetic rutile.

5. The method of claim 4, in which the liquid reagent sidestream contains salts giving solid reduction products which are deposited on the said particles, said particles being continually withdrawn and leached to extract soluble solids therefrom and then returned to the fluidized bed.

6. The method of claim 5, in which said withdrawn bed particles are leached with said liquid reagent sidestream to produce a slurry of leached particles and reagent and a separable liquid phase enriched in said soluble solids, said slurry being separated from said liquid phase and fed to the fluidized bed while said separated liquid phase is recycled to the liquid reagent of the gas purification process.

7. The method of claim 6, in which two gas purification stages are utilized, wherein a sidestream of the liquid reagent of the first gas purification stage is used to leach said withdrawn particles and to form said slurry and a sidestream of the liquid reagent of the second gas purification stage is added to said slurry and introduced therewith to the fluidised bed.

8. The method of claim 6, in which two gas purification stages are utilized, wherein portions of withdrawn particles are leached with sidestreams of the liquid reagents of said individual gas purification stages to form individual slurry portions and associated liquid phases, said liquid phases portions being recycled to the respective liquid reagents from which the individual sidestreams are derived.

9. In a gas purification process in which at least one contaminant selected from the group consisting of $H_2S$ and HCN is extracted from a foul gas stream by absorption in a liquid reagent, $H_2S$ thereby being converted to sulphur and HCN to thiocyanate and the reagent being subsequently regenerated and recycled for absorption of further contaminant, the improvement which comprises decontaminating the liquid reagent by a. bleeding-off a sidestream of said liquid reagent;

b. reducing said sidestream to substantially gaseous and solid products in a bed of inert particles fluidized by a reducing gas at a temperature range of 500° to 800°C. at atmospheric pressure, said reducing gas being selected from the group consisting of hydrogen and a hydrogen-containing gas;

c. recycling the gaseous products of said reduction to the said foul gas stream; and d. returning the solid products of said reduction to the said liquid reagent.

10. The process of claim 1, wherein the liquid reagent is an alkaline anthraquinone disulphonic acid salt solution.

11. The process of claim 1, wherein the liquid reagent is an alkaline polysulphide solution.

* * * * *